(12) United States Patent
Morimoto et al.

(10) Patent No.: US 8,907,938 B2
(45) Date of Patent: Dec. 9, 2014

(54) LIQUID CRYSTAL DISPLAY DEVICE

(75) Inventors: Kazunori Morimoto, Osaka (JP); Takehiko Sakai, Osaka (JP); Tetsuo Fujita, Osaka (JP); Dai Chiba, Osaka (JP); Katsuhiko Morishita, Osaka (JP); Tsuyoshi Okazaki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 275 days.

(21) Appl. No.: 13/318,388

(22) PCT Filed: Feb. 18, 2010

(86) PCT No.: PCT/JP2010/052442
§ 371 (c)(1),
(2), (4) Date: Nov. 1, 2011

(87) PCT Pub. No.: WO2010/137363
PCT Pub. Date: Dec. 2, 2010

(65) Prior Publication Data
US 2012/0050246 A1 Mar. 1, 2012

(30) Foreign Application Priority Data

May 28, 2009 (JP) ................. 2009-129515

(51) Int. Cl.
*G06F 3/038* (2013.01)
*G09G 5/00* (2006.01)
*G02F 1/1343* (2006.01)

(52) U.S. Cl.
CPC ............ *G02F 1/134363* (2013.01); *G02F 2001/134318* (2013.01)
USPC .......................................... 345/211; 345/87

(58) Field of Classification Search
USPC ........................................... 345/87–102, 211
See application file for complete search history.

(56) References Cited

U.S. PATENT DOCUMENTS 6,181,402 B1 * 1/2001 Shim et al. ................ 349/130
6,495,218 B1 12/2002 Yamamoto et al.
(Continued)

FOREIGN PATENT DOCUMENTS

JP 7-191336 7/1995
JP 10-333171 12/1998
(Continued)

OTHER PUBLICATIONS

International Search Report for PCT/JP2010/052442 mailed on Mar. 23, 2010.

*Primary Examiner* — Kevin M Nguyen
*Assistant Examiner* — Kenneth B Lee, Jr.
(74) *Attorney, Agent, or Firm* — Nixon & Vanderhye P.C.

(57) ABSTRACT

A liquid crystal display device which can suppress generation of a locally luminous part where a dark line disappears. The display device includes: a pair of substrates, a liquid crystal layer sandwiched between the pair of substrates, wherein one of the pair of substrates includes a pair of electrodes in pixel. At least one of the electrodes may include a comb-tooth portion. A first comb-tooth portion of one of the pair of electrodes and a second comb-tooth portion of the other one of the pair of electrodes may be disposed to face each other. The distance between the pair of electrodes in a transverse direction of the comb-tooth portions of the pair of electrodes is at most 10 μm in example embodiments, and a rotational viscosity of the p-type nematic liquid crystals may be at least 130 mPa·s.

17 Claims, 7 Drawing Sheets

(56) References Cited

U.S. PATENT DOCUMENTS

| | | |
|---|---|---|
| 6,704,083 B1 | 3/2004 | Kim et al. |
| 6,781,657 B1 | 8/2004 | Kim et al. |
| 2002/0031619 A1* | 3/2002 | Heckmeier et al. ............ 428/1.1 |
| 2003/0086044 A1 | 5/2003 | Inoue et al. |
| 2003/0197824 A1 | 10/2003 | Shim et al. |
| 2004/0114084 A1 | 6/2004 | Kim et al. |
| 2005/0253988 A1 | 11/2005 | Inoue et al. |

FOREIGN PATENT DOCUMENTS

| | | |
|---|---|---|
| JP | 11-24068 | 1/1999 |
| JP | 2000-109842 | 4/2000 |
| JP | 2002-12869 | 1/2002 |
| JP | 2003-177418 | 6/2003 |

* cited by examiner (a)

(b)

LIQUID CRYSTAL DISPLAY DEVICE

This application is the U.S. national phase of International Application No. PCT/JP2010/052442 filed 18 Feb. 2010 which designated the U.S. and claims priority to JP 2009-129515 filed 28 May 2009, the entire contents of each of which are hereby incorporated by reference.

TECHNICAL FIELD

The present invention relates to a liquid crystal display device. More specifically, the present invention relates to a liquid crystal display device which can be suitably used for a liquid crystal display device in a Transverse Bend Alignment (TBA) mode.

BACKGROUND ART

Liquid crystal display devices are characterized by thin profile, lightweight and low power consumption, and are widely used in various fields. The display performance thereof has advanced dramatically over the years, and now even surpass CRTs (Cathode Ray Tube).

A display type of a liquid crystal display device is determined depending on how liquid crystals are aligned in a cell. Conventionally known display types of liquid crystal display devices are, for example, a TN (Twisted Nematic) mode, an MVA (Multi-domain Vertical Alignment) mode, an IPS (In-Plane Switching) mode and an OCB (Optically self-Compensated Birefringence) mode.

Liquid crystal display devices with such display types have been mass produced. Particularly liquid crystal display devices in a TN mode are widely used by the general public. However, liquid crystal display devices in a TN mode require improvement in terms of increasing the response speed and viewing angle.

Meanwhile, in an MVA mode, slits are formed in a pixel electrode of an active matrix substrate, and protrusions (ribs) for controlling the alignment of liquid crystal molecules are disposed in the counter electrode of the counter substrate, so that fringe fields generated by these slits and ribs disperse the alignment direction of the liquid crystal molecules into a plurality of directions. An MVA mode implements a wide viewing angle by dividing the directions, where liquid crystal molecules tilt down when a voltage is applied, into a plurality of types (multi-domains). Since an MVA mode is a vertical alignment mode, higher contrast can be obtained compared with TN, IPS and OCB modes. However, an MVA mode requires improvements in terms of simplifying manufacturing steps, and also in increasing the response speed, just like the case of a TN mode.

With regard to liquid crystal display devices of an MVA mode and IPS mode, there has been disclosed a substrate for a liquid crystal display device comprising a substrate that is disposed opposite to a counter substrate and holds liquid crystal with the counter substrate, a bus line formed on the substrate, a switching element connected to the bus line, a stripe-shaped electrode connected to the switching element, and a space. The stripe-shaped electrode and the space are parallel to the bus-line. The substrate has a pixel electrode in which the width of the stripe-shaped electrode in the neighborhood of the bus line is narrower than the width of an electrode located at an inner side of the stripe-shaped electrode (see, for example, Patent Document 1).

In order to solve the process problems of an MVA mode, a vertical alignment mode "Trans Bend Alignment (TBA) mode" has been developed. In TBA mode, p-type nematic liquid crystals are used as a liquid crystal material. Further, in a TBA mode, a transverse electric field is generated by using at least two kinds of electrodes such as a comb-shaped electrode, and the liquid crystals are driven by the transverse electric field so that the alignment azimuth of the liquid crystal is set. TBA mode can maintain a high contrast due to the vertical alignment. Moreover, TBA mode has a simple pixel configuration because it does not require alignment control using protrusions. Further, TBA mode is excellent in viewing angle characteristics.

Meanwhile, in a TBA mode, upon application of voltages, the liquid crystal molecules aligned in the vertical direction to the substrate surface exist at about the center between the two kinds of electrodes. For this reason, in the observation from the front side of the panel, the area looks as a dark line.

Patent Document 1: JP-A 2003-177418

SUMMARY OF THE INVENTION

When a pressure is locally applied from outside to the panel surface of a TBA mode liquid crystal display device, for example when the panel surface is pressed by a finger, the dark line disappears, while a locally luminous part (hereinafter, this part is also referred to as a finger press domain) is sometimes observed. The finger press domain does not disappear during the voltage application, until voltage is cut off.

The reason for this phenomenon can be explained as follows: While a voltage is applied, liquid crystal molecules 4 are aligned vertically to the substrate surface in the region where a dark line 8 appears as shown in FIG. 11(a). However, pressure on the panel surface from outside tilts the vertically standing liquid crystal molecules 4 down, so that the liquid crystal molecules are aligned in a transverse direction (horizontal direction, direction parallel to the substrate surface), and the dark line disappears as shown in FIG. 11(b). As a result, a locally luminous part supposedly appears.

Moreover, since an electric field in a transverse direction (horizontal direction, direction parallel to the substrate surface) is generated at about the center between the electrodes, the tilted liquid crystal molecules maintain the tilted state while a voltage is applied. The liquid crystal molecules do not recover the vertical alignment state until the applied voltage is cut off. Therefore, supposedly the finger press domain keeps appearing when a voltage is applied, and does not disappear until the applied voltage is cut off.

With the foregoing current situation in view, it is an object of the present invention to provide a liquid crystal display device capable of suppressing generation of a locally luminous part where a dark line disappears.

The present inventors have made various studies on a liquid crystal display device capable of suppressing generation of a locally luminous part where a dark line disappears, and consequently they came to focus their attention to electrode patterns and rotational viscosity of liquid crystal materials. The present inventors have found that, if the distance between the electrodes or the length of the region where the distance between the electrodes are constant is set to at most a predetermined length, and also the rotational viscosity of the liquid crystal materials is set to at least a predetermined level, tilting down of the liquid crystal molecules in the dark line part can be suppressed even when a pressure is applied from outside to the panel surface. Accordingly, the present inventors have completed the present invention that can excellently solve the above problems.

Namely, the present invention relates to a liquid crystal display device including: a pair of substrates disposed to face each other, and a liquid crystal layer sandwiched between the pair of substrates, wherein one of the pair of substrates includes a pair of electrodes in pixel, each of the electrodes including a comb-tooth portion, a first comb-tooth portion of one of the pair of electrodes and a second comb-tooth portion of the other one of the pair of electrodes are disposed to face each other, the liquid crystal layer includes p-type nematic liquid crystals and is driven by an electric field generated between the pair of electrodes, the p-type nematic liquid crystals are aligned perpendicularly to surfaces of the pair of substrates when no voltage is applied, the distance between the pair of electrodes in a transverse direction of the comb-tooth portions of the pair of electrodes is at most 10 μm, and a rotational viscosity of the p-type nematic liquid crystals is at least 130 mPa·s (hereinafter also referred to as "first liquid crystal display device of the present invention").

In the first liquid crystal display device of the present invention, if the distance between the pair of electrodes in a transverse direction of the comb-tooth portions of the pair of electrodes exceeds 10 or if the rotational viscosity is less than 130 mPa·s, a finger press domain may be generated.

The configuration of the first liquid crystal display device of the present invention is not particularly limited by other structural elements, as long as the above structural elements are required essentials.

Preferable embodiments of the first liquid crystal display device of the present invention are described in detail below.

Each of the embodiments below may be appropriately employed in combination.

The distance between the pair of electrodes in the transverse direction of the comb-tooth portions of the pair of electrodes may be at most 9.5 μm, at most 9 μm, at most 8.5 μm, and at most 8 μm.

The rotational viscosity may be at least 140 mPa·s, at least 145 mPa·s, at least 150 mPa·s, and at least 155 mPa·s.

The distance between the pair of electrodes in the transverse direction of the comb-tooth portions of the pair of electrodes is preferably at most 6 μm (more preferably 5 μm, further preferably 4.5 and particularly preferably 4 μm). The above range of the distance can more surely suppress generation of a finger press domain.

The rotational viscosity is preferably 300 mPa·s (more preferably 340 mPa·s, further preferably 360 mPa·s, and particularly preferably 370 mPa·s). The above range of the rotational viscosity can more surely suppress generation of a finger press domain.

In the liquid crystal display device, a blank portion of the pair of electrodes is provided adjacent to at least one of the first comb-tooth portion and the second comb-tooth portion of the pair of electrodes, the blank portion is positioned in the transverse direction of the comb-tooth portion that the blank portion is adjacent to, and the blank portion includes an equally-distanced portion having a constant length in the transverse direction of the comb-tooth portion that the blank portion is adjacent to.

Meanwhile, in the first liquid crystal display device of the present invention, the distance between the pair of electrodes in the transverse direction of the comb-tooth portions of the pair of electrodes is sufficiently small, and the rotational viscosity of the p-type nematic liquid crystal is sufficiently high. Therefore, the length of the comb-tooth portions (in more detail, length of the comb-tooth portions in a longitudinal direction) and the length of the equally-distanced portion (in more detail, length of the equally-distanced portion in a longitudinal direction of the comb-tooth portions that the blank portion is adjacent to) do not influence the generation of a finger press domain. The length of the comb-tooth portions and the length of the equally-distanced portion are not particularly limited, and may be independently set appropriately.

The present invention also relates to a liquid crystal display device including: a pair of substrates disposed to face each other, and a liquid crystal layer sandwiched between the pair of substrates, wherein one of the pair of substrates includes a pair of electrodes in pixel, each of the electrodes including a comb-tooth portion, a first comb-tooth portion of one of the pair of electrodes and a second comb-tooth portion of the other one of the pair of electrodes are disposed to face each other, the liquid crystal layer includes p-type nematic liquid crystals and is driven by an electric field generated between the pair of electrodes, the p-type nematic liquid crystals are aligned perpendicularly to surfaces of the pair of substrates when no voltage is applied, a blank portion of the pair of electrodes is provided adjacent to at least one of the first comb-tooth portion and the second comb-tooth portion of the pair of electrodes, the blank portion is positioned in the transverse direction of the comb-tooth portion that the blank portion is adjacent to, the blank portion includes an equally-distanced portion having a constant length in the transverse direction of the comb-tooth portion that the blank portion is adjacent to, the equally-distanced portion has a length of at most 10 μm in the longitudinal direction of the comb-tooth portion that the blank portion is adjacent to, and a rotational viscosity of the p-type nematic liquid crystals is at least 130 mPa·s (hereinafter, also referred to as "second liquid crystal display device of the present invention").

In the second liquid crystal display device of the present invention, if the length of the equally distanced portion in the longitudinal direction of the comb-tooth portions that the blank portion is adjacent to exceeds 10 μm, or if the rotational viscosity of the type-p nematic liquid crystals is lower than 130 mPa·s, a finger press domain may be generated.

The configuration of the second liquid crystal display device of the present invention is not particularly limited by other structural elements, as long as the above structural elements are required essentials.

Preferable embodiments of the second liquid crystal display device of the present invention are described in detail below. Each of the embodiments below may be appropriately employed in combination.

The length of the equally distanced portion in the longitudinal direction of the comb-tooth portions that the blank portion is adjacent to may be at most 9 μm, at most 8 μm, at most 7.5 μm, and at most 7 μm.

The rotational viscosity may be at least 140 mPa·s, at least 145 mPa·s, at least 150 mPa·s, and at least 155 mPa·s.

The length of the equally distanced portion in the longitudinal direction of the comb-tooth portions that the blank portion is adjacent to is preferably at most 6 μm (more preferably 5.5 μm, further preferably 5.3 μm, and particularly preferably 5 μm). The above range of the length can more surely suppress generation of a finger press domain.

The rotational viscosity is preferably 300 mPa·s (more preferably 340 mPa·s, further preferably 360 mPa·s, and particularly preferably 370 mPa·s). The above range of the rotational viscosity can more surely suppress generation of a finger press domain.

The distance between the pair of electrodes in the transverse direction of the comb-tooth portions of the pair of electrodes may be at least 8 μm (more preferably 10 μm, further preferably 11 μm, particularly preferably 11.5 μm, and most preferably 12 μm).

The distance between the pair of electrodes in the transverse direction of the comb-tooth portions of the pair of electrodes is preferably at most 16 μm (more preferably 14 μm, further preferably 13 μm, particularly preferably 12.5 μm, and most preferably 12 μm).

The present inventors have also focused their attention on the shape of the pair of electrodes each having a comb-tooth portion, and found the following: By reducing the distance between the electrodes at least at two sites in the longitudinal direction of the comb-tooth portions, a part where the distance between the electrodes is large (first part) can be sandwiched by the two parts (second part and third part) where the distance between the electrodes is small. Thereby, due to the influence of the vertically-aligned liquid crystal molecules located in the parts where the distance between the electrodes is small, the liquid crystal molecules located in the part where the distance between the electrodes is large do not easily tilt down even when a pressure is applied to the panel surface. Accordingly, the present inventors have successfully solved the above problems.

As mentioned earlier, the present invention further relates to a liquid crystal display device including: a pair of substrates disposed to face each other, and a liquid crystal layer sandwiched between the pair of substrates, wherein one of the pair of substrates includes a pair of electrodes in pixel, each of the electrodes including a comb-tooth portion, a first comb-tooth portion of one of the pair of electrodes and a second comb-tooth portion of the other one of the pair of electrodes are disposed to face each other, the liquid crystal layer includes p-type nematic liquid crystals and is driven by an electric field generated between the pair of electrodes, the distance between the pair of electrodes changes along a longitudinal direction of the comb-tooth portions of the pair of electrodes, the pair of electrodes include a first part in which the pair of electrodes face each other with a first distance between them; a second part in which the pair of electrodes face each other with a second distance smaller than the first distance between them; and a third part in which the pair of electrodes face each other with a third distance smaller than the first distance between them, and the second part, the first part, and the third part are adjacent one another in said order in the longitudinal direction of the comb-tooth portions of the pair of electrode (hereinafter, also referred to as "third liquid crystal display device of the present invention").

The configuration of the third liquid crystal display device of the present invention is not particularly limited by other structural elements, as long as the above structural elements are required essentials.

Preferable embodiments of the third liquid crystal display device of the present invention are described in detail below. Each of the embodiments below may be appropriately employed in combination.

The pair of substrates may face parallel to each other in the second part, the first part, and the third part.

The second distance and the third distance may be the same.

The first to the third liquid crystal display devices of the present invention may be appropriately combined. Each embodiment explained in the inventions may also be appropriately combined.

The third liquid crystal display device of the present invention in particular is preferably applicable to the first or the second liquid crystal display device of the present invention.

In more specific, in the first liquid crystal display device of the present invention, preferably a blank portion of the pair of electrodes is provided adjacent to at least one of the first comb-tooth portion and the second comb-tooth portion of the pair of electrodes, the blank portion is positioned in the transverse direction of the comb-tooth portion that the blank portion is adjacent to, the blank portion includes an equally-distanced portion having a constant length in the transverse direction of the comb-tooth portion that the blank portion is adjacent to, the distance between the pair of electrodes changes along a longitudinal direction of the comb-tooth portions of the pair of electrodes, the pair of electrodes include a first part in which the pair of electrodes face each other with a first distance between them; a second part in which the pair of electrodes face each other with a second distance smaller than the first distance between them; and a third part in which the pair of electrodes face each other with a third distance smaller than the first distance between them, the second part, the first part, and the third part are adjacent one another in said order in the longitudinal direction of the comb-tooth portions of the pair of electrode, and the equally-distanced portion is adjacent to the first part.

In the second liquid crystal display device of the present invention, preferably the distance between the pair of electrodes changes along a longitudinal direction of the comb-tooth portions of the pair of electrodes, the pair of electrodes include a first part in which the pair of electrodes face each other with a first distance between them; a second part in which the pair of electrodes face each other with a second distance smaller than the first distance between them; and a third part in which the pair of electrodes face each other with a third distance smaller than the first distance between them, the second part, the first part, and the third part are adjacent one another in said order in the longitudinal direction of the comb-tooth portions of the pair of electrode, and the equally-distanced portion is adjacent to the first part.

Moreover, in the first and the second liquid crystal display devices of the present invention, the pair of electrodes face parallel to each other in the second part, the first part, and the third part.

Further, in the first and the second liquid crystal display devices of the present invention, the second distance may be the same with the third distance.

Meanwhile, in the first to the third liquid crystal display devices of the present invention, "perpendicular" needs not to be exactly perpendicular as long as the liquid crystal display device can function as a liquid crystal display device in a TBA mode.

In the first to the third liquid crystal display devices of the present invention, "constant" may be substantially constant, and include almost constant.

Further, in the first to the third liquid crystal display devices of the present invention, "equal" may be substantially equal.

The first to the third liquid crystal display devices of the present invention may be a color liquid crystal display device, and the pixel may be a dot (sub-pixel).

EFFECTS OF THE INVENTION

The liquid crystal display device of the present invention can suppress generation of a locally luminous part where a dark line disappears.

MODE FOR CARRYING OUT THE INVENTION

Embodiments of the present invention will now be described in detail with reference to the drawings, but the present invention is not limited to only these embodiments.

In each embodiment described below, it is assumed that the 3 o'clock direction, 12 o'clock direction, 9 o'clock direction and 6 o'clock direction, when the liquid crystal display panel is viewed from the front, are the 0° direction (azimuth), 90° direction (azimuth), 180° direction (azimuth) and 270° direction (azimuth), respectively, and a direction passing through the 3 o'clock and 9 o'clock is the lateral direction, and a direction passing through 12 o'clock and 6 o'clock is the vertical direction.

In the figure described below shows a single or a plurality of dot(s) (sub-pixel); however, a plurality of dots are provided in a matrix form in the display area (image display area) of the liquid crystal display device of each embodiment.

The rotational viscosity used herein is measured by a method described in JP-A 2007-3224. The rotational viscosity coefficient $\gamma_1$ in JP-A 2007-3224 corresponds to the rotational viscosity of the present invention.

(Embodiment 1)

The liquid crystal display device of the present embodiment is a transparent liquid crystal display device using the TBA method (TBAmode), out of the transverse electric field methods in which an electric field (transverse electric field) in the substrate surface direction (horizontal direction, parallel direction to the substrate surface) is applied to the liquid crystal layer, and an image is displayed by controlling the alignment of the liquid crystal molecules.

Figure 1:
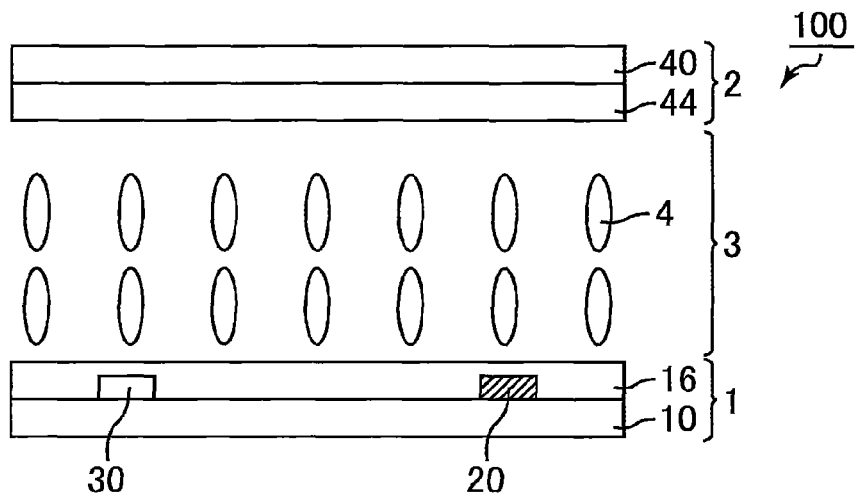
FIG. 1 is a cross-sectional view schematically depicting a liquid crystal display device of Embodiment 1 when no voltage is applied.

As shown in FIG. 1, the liquid crystal display device of the present embodiment has a liquid crystal display panel 100, and the liquid crystal display panel 100 has an active matrix substrate (array substrate) 1 and a counter substrate 2, which are a pair of substrates disposed to face each other, and a liquid crystal layer 3 sandwiched between these substrates.

A pair of linear polarizers are disposed on the main outer surfaces (opposite side of the liquid crystal layer 3) of the array substrate 1 and the counter substrate 2. An absorption axis of one of the linear polarizers on the array substrate 1 side is disposed in a 45° direction, and an absorption axis of the other linear polarizers on the counter substrate 2 side is disposed in a 135° direction. Thus, both of the linear polarizers are disposed in crossed nicols. Both of the absorption axes form an angle of 45° to the longitudinal direction of a comb-tooth portion 22 of a pixel electrode 20 and a comb-tooth portion 32 of a common electrode 30 mentioned below.

The array substrate 1 and the counter substrate 2 are attached, via spacers such as plastic beads, by a sealant surrounding the display area. A liquid crystal material as a display media constituting an optical modulation layer is sealed in the gap between the array substrate 1 and the counter substrate 2 so that the liquid crystal layer 3 is formed.

The liquid crystal layer 3 includes a nematic liquid crystal material having positive dielectric anisotropy (p-type nematic liquid crystal material). The liquid crystal molecules 4 of the p-type nematic liquid crystal material present homeotropic alignment when no voltage is applied (when an electric field is not generated between the later mentioned pixel electrode 20 and common electrode 30) due to the alignment control force of the vertical alignment film, which is disposed on the surfaces of the array substrate 1 and the counter substrate 2 on the liquid crystal layer 3 side. More specifically, when no voltage is applied, the long axes of the liquid crystal molecules 4 form an angle of 88° or more (more preferably an angle of 89° or more) with respect to the array substrate 1 and the counter substrate 2.

Panel retardation dΔn (product of a cell gap d and double refractive index Δn of the liquid crystal material) is preferably 275 nm to 460 nm, and is more preferably 280 nm to 400 nm. In this way, it is preferable that the lower limit of dΔn is half the wavelength of green (550 nm) or more, when a mode is considered. The upper limit of dΔn is preferably in a range that can be compensated by the retardation Rth in a normal line direction of a negative C plate (single layer). The negative C plate is disposed to compensate for white floating which is observed when the observation direction is tilted upon black display. Rth could be increased by stacking negative C plates, which is however not preferable because of cost increase.

The dielectric constant Δ∈ of the liquid crystal material is preferably 10 to 25, and more preferably 15 to 25. The lower limit of Δ∈ is preferably about 10 (more preferably 15) or more to prevent the white voltage (voltage upon white display) from getting high. A greater Δ∈ is better because the drive voltage can be decreased more. However, given that an easily obtainable material is used, the upper limit of Δ∈ is preferably 25 or less as mentioned earlier.

The counter substrate 2 has, on the main surface of an achromatic transparent insulating substrates 40 on the liquid crystal layer 3 side thereof, a black matrix (BM) layer 41 for shielding light between dots, a plurality of color layers (color filters) disposed corresponding to the dots, and a vertical alignment film 44 disposed on the surface at the liquid crystal layer 3 side so as to cover these structures. The BM layer 41 is formed of an opaque metal such as Cr, an opaque organic film such as acrylic resin containing carbon, or the like, and is formed in an area corresponding to the boundary area of adjacent dots. Meanwhile, the color layer is used for color display, and is formed of a transparent organic film or the like, such as an acrylic resin film containing a pigment. The color layer is mainly formed in the dot area.

In this way, the liquid crystal display device of the present embodiment is a color liquid crystal display device (color active matrix liquid crystal display device) having a color layer on the counter substrate 2 in which one pixel is constituted by three dots outputting red light R, green light G and blue light B, respectively. A type and the number of colors of dots constituting each pixel are not especially limited, and can be set appropriately. In other words, in the liquid crystal display device of the present embodiment, each pixel may consist of three colors of dots: cyan, magenta and yellow, or may consist of four or more colors of dots.

Meanwhile, the array substrate (TFT array substrate) 1 has, on the main surface of the achromatic transparent insulating substrate 10 on the liquid crystal layer 3 side thereof, gate bus lines 11, Cs bus lines 12, source bus lines 13, TFTs 14 each of which being a switching element and being disposed in a dot, drain lines (drain electrodes) 15 each of which being connected to the TFT, pixel electrodes 20 each of which being independently disposed in the dot, a common electrode 30 which is disposed for every dots, and a vertical alignment film 16 disposed on the surface of the liquid crystal layer 3 side so as to cover these structures.

The TFTs 14 are provided in the vicinity of the intersection of the gate bus lines 11 and the source bus line 13, and include a semiconductor layer 17.

The semiconductor layer 17 is formed in an island shape on the gate bus line 13 via a gate insulating film, and is formed of an amorphous silicon film.

The vertical alignment films 16, 44 are formed by coating a known alignment layer material, such as polyimide. The vertical alignment films 16, 44 are normally not rubbing-processed, but can align the liquid crystal molecules 4 substantially perpendicular to the film surface when no voltage is applied.

Figure 2:
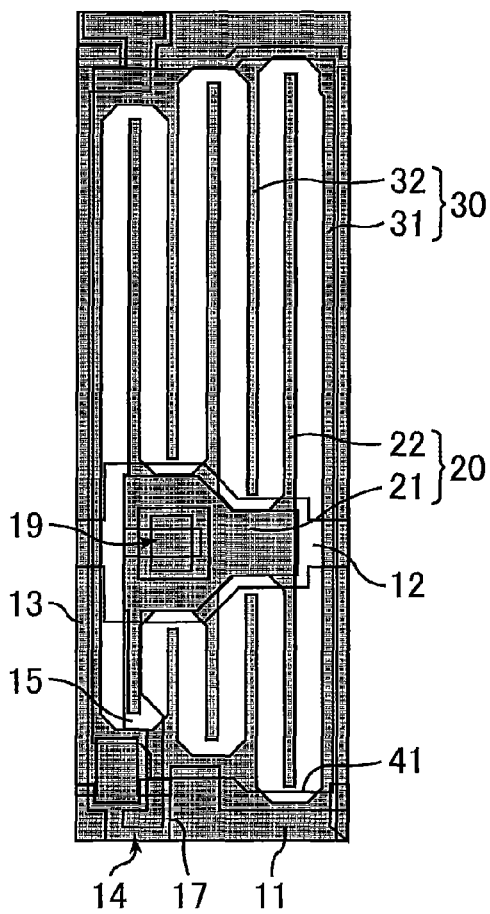
FIG. 2 is a plan view schematically depicting a liquid crystal display device of Embodiment 1.

On the array substrate 1 on the liquid crystal layer 3 side, pixel electrodes 20 are disposed corresponding to each dot, and a common electrode 30 is disposed integrally for all the adjacent picture elements, as shown in FIG. 2.

Image signals (picture signals) are supplied from the source bus line 13 (for example, width: 5 μm) to the pixel electrode 20 via the thin film transistor (TFT) 14 whici is a switching element. Accordingly, a rectangular wave is applied to the pixel electrode 20 depending on the image signals. Each pixel electrode 20 is electrically connected to the drain line 15 via a contact hole 19 disposed on the interlayer insulating film. A common signal which is common to each dots supplied to the common electrode 30. The common electrode 30 is connected to a common voltage generation circuit via the Cs bus line 12, and is set to a predetermined potential (typically 0 V).

The source bus line 13 extends between adjacent pixel elements in the vertical direction, and is connected to a source driver (data line drive circuit). The gate bus line 11 (for example, width: 5 μm) extends between adjacent dots in the lateral direction, and is connected to a gate driver (scanning line drive circuit). The gate line 11 also functions as a gate for the TFT 14. Pulsed scanning signals are supplied to the gate bus line 11 from the gate driver at a predetermined timing.

The scanning signals are applied to each TFT 14 by a sequential line method. The TFT 14 becomes ON state only for a predetermined period by the input of the scanning signals. The image signals are supplied from the source bus line 13 to the pixel electrode 20 at a predetermined timing while the TFT 14 is in ON state. Thereby, the image signals are written in the liquid crystal layer 3.

After being written to the liquid crystal layer 3, the image signals are retained for a predetermined period between the pixel electrode 20, to which the image signals are applied, and the common electrode 30 which faces the pixel electrode 20. In other words, capacitance (liquid crystal capacitance) is formed between the pixel electrode 20 and the common electrode 30 for a predetermined period. In order to prevent leakage of the image signals that are retained, storage capacitance is formed parallel with the liquid crystal capacitance. The storage capacitance is formed, in each dot, between the drain line 15 of the TFT 14 and the Cs bus line 12 (storage capacitance line, for example, the width: 5 μm) which is disposed parallel with the gate bus line 11.

The pixel electrode 20 is formed of a transparent conductive film such as an ITO film and an IZO film, a metal film such as an aluminum film and chrome film, or the like. The shape of the pixel electrode 20 in a plan view of the liquid crystal display panel 100 is a comb shape. More specifically, the pixel electrode 20 includes an island-shaped trunk portion 21 (connection portion) which is disposed at about a center of the dot area so as to vertically part the dot area. The picture electrode 20 also includes comb-tooth portions 22 each having a line shape in a plan view, which are connected to the trunk portion 21 and are disposed in a 90° direction or in a 270° direction.

The common electrode 30 is also formed by a transparent conductive film such as an ITO film and an ITO film, a metal film such as an aluminum film, or the like, and has a comb shape in a plan view in each dot. More specifically, the common electrode 30 includes a lattice-shaped trunk portion 31 (connection portion) which is vertically and laterally disposed so as to be superposed on the gate bus line 11 and the source bus line 13 in a plan view, and comb-tooth portions 32 each having a line shape in a plan view, which are connected to the trunk portion 31 and are disposed in a 270° or 90° direction.

In this way, the pixel electrode 20 and the common electrode 30 are disposed to face one another in a plan view in the dots. Moreover, the comb-tooth portion 22 of the pixel electrode 20 and the comb-tooth portion 32 of the common electrode 30 have complementary plane shapes, and are disposed alternately with a predetermined distance. In other words, the comb-tooth portion 22 of the pixel electrode 20 and the comb-tooth portion 32 of the common electrode 30 are disposed facing each other in parallel on the same plane. Furthermore, the comb-shaped pixel electrode 20 and the comb-shaped common electrode 30 are disposed facing each other so that the comb-tooth portions 22 and the comb-tooth portions 32 engage with each other. Moreover, the pixel electrode 20 and the common electrode 30 are disposed on the same layer of the interlayer insulation film. Thereby, the transverse electric field can be formed at high density between the pixel electrode 20 and the common electrode 30, and the liquid crystal layer can be controlled at higher precision.

In terms of increasing the transmittance, the smaller the widths of the pixel electrode 20 and the common electrode 30 (the width of the comb-tooth portion 22 of the pixel electrode 20 and the width of the comb-tooth portion 32 of the common electrode 30) are, the better. According to the current process rule, it is preferable to set the widths to about 1 to 5 µm (1.5 to 4 µm to be more preferable).

The distance S between the pixel electrode 20 and the common electrode 30 is not particularly limited, and is preferably 1 to 20 µm (more preferably 2 to 12 µm). In more detail, the distance S between the pixel electrode 20 and the common electrode 30 is the distance between the pixel electrode 20 and the common electrode 30 (normally, the comb-tooth portion 22 and the comb-tooth portion 32) in the transverse direction of the comb-tooth portion 22 and the comb-tooth portion 32 (hereinafter, also simply referred to as "distance S between the electrodes"). If the distance S between the electrodes exceeds 20 µm, the response speed may decrease extremely, and also the Voltage (V)-Transmittance (T) characteristics may greatly shift on the high voltage side, exceeding the driver voltage range in some cases. If the distance S between the electrodes is less than 1 µm, the electrode may not be formed by a photolithography method.

The liquid crystal display device of the present embodiment displays images by applying image signals (voltage) to the pixel electrode 20 via the TFT 14 to generate an electric field (transverse electric field 5) in the direction for the main surfaces of the substrate 1 and the substrate 2 between the pixel electrode 20 and the common electrode 30. Then, the liquid crystal layer 3 is driven by the transverse electric field 5, and the transmittance of each dot is changed so that images are displayed.

More specifically, in the liquid crystal display device of the present embodiment, an electric field intensity distribution is formed by applying voltage in the liquid crystal layer 3, and the resulting distortion in the alignment of the liquid crystal molecules 4 changes the retardation of the liquid crystal layer 3. The initial alignment state of the liquid crystal layer 3 is a homeotropic alignment. Then, a bend electric field is formed by applying a voltage to the pixel electrode 20 and common electrode 30, which have a comb shape, so that a transverse electric field 5 is formed in the liquid crystal layer 3. As a result, two domains in which director directions are 180° different from each other are formed between the electrode 20 and the electrode 30. Moreover, in each of the domain, the liquid crystal molecules 4 of the nematic liquid crystal materials present a bend liquid crystal alignment (bend alignment).

Figure 3:
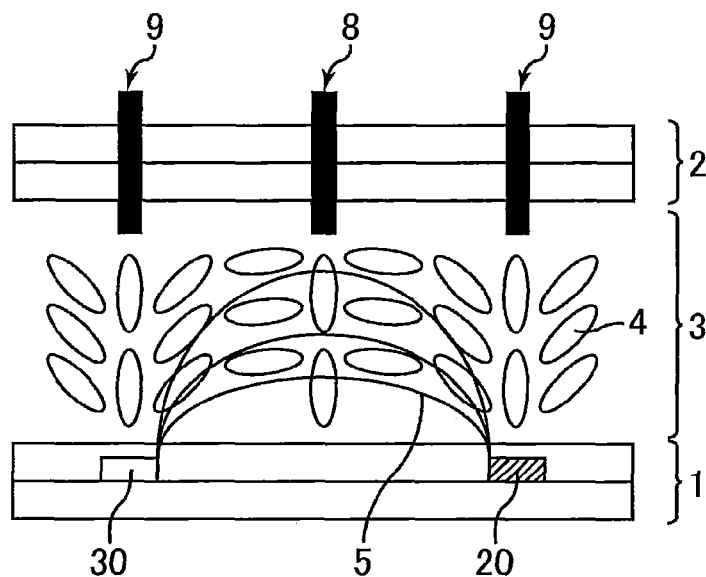
FIG. 3 is a cross-sectional view schematically depicting a liquid crystal display device of Embodiment 1 when a voltage is applied.
Figure 4:
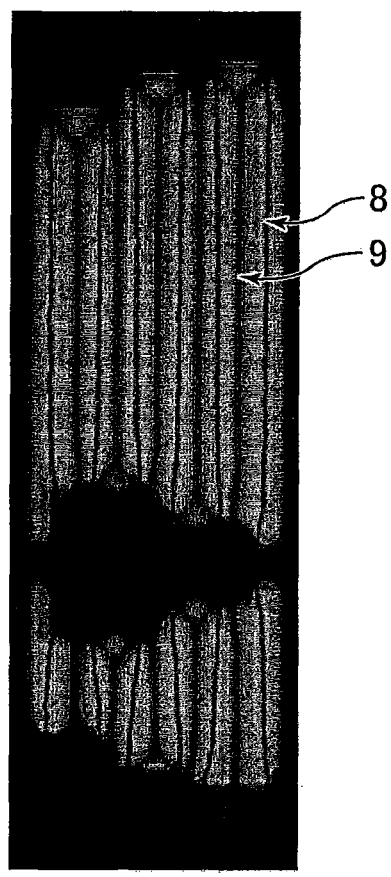
FIG. 4 shows an optical microphotograph of a liquid crystal display device of Embodiment 1.

In the region where the two domains are adjacent each other (normally, the region on the center line of the space between the pixel electrode 20 and the common electrode 30), the liquid crystal molecules 4 always align vertically irrespective of the applied voltage value. The liquid crystal molecules in the vicinity of the pixel electrode 20 and the common electrode 30 align along the equipotential line of the transverse electric field 5, and thus tilt in a diagonal direction. However, the liquid crystal molecules in the vicinity of the center of the space between the pixel electrode 20 and the common electrode 30 cannot tilt because of other liquid crystal molecules which tilt from the pixel electrode 20 side and the common electrode 30 side. For this reason, the liquid crystal molecules in the vicinity of the center of the space between the pixel electrode 20 and the common electrode 30 always align in a vertical direction irrespective of the applied voltage value. Therefore, as FIG. 3 and FIG. 4 show, a dark line (dark line 8) always appears in this region irrespective of the level of the applied voltage.

On the comb-tooth portions 22 and 23, the liquid crystal molecules 4 always vertically align irrespective of the level of the applied voltage. Thus, a dark line (dark line 9) always appears irrespective of the level of the applied voltage.

Figure 11:
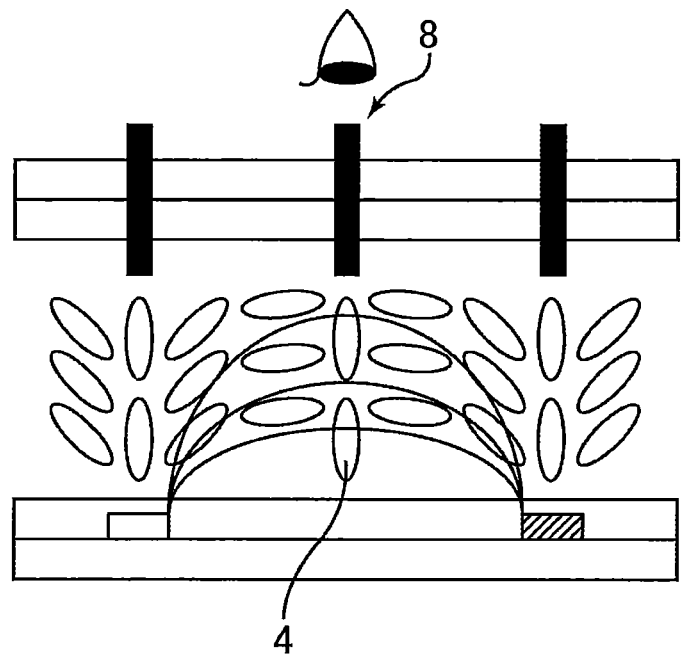
FIG. 11(a) and FIG. 11(b) each are a cross-sectional view schematically depicting a liquid crystal display device in a TBA mode of a comparative embodiment when a voltage is applied.
Figure 11:
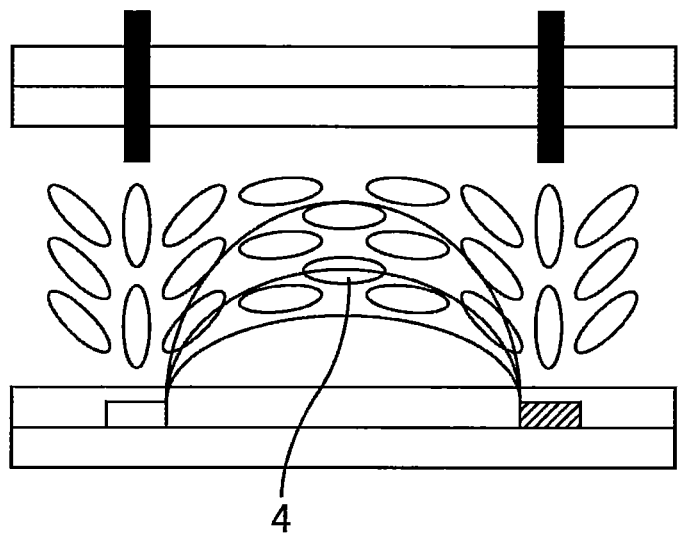

However, as explained with reference to FIG. 11, a finger press domain may occur in such liquid crystal display devices in the TBA mode. In especially the case where the distance S between the electrodes is uniform and wide, the voltage applied to the liquid crystal layer 3 is small, thereby easily generating a finger press domain.

Figure 5:
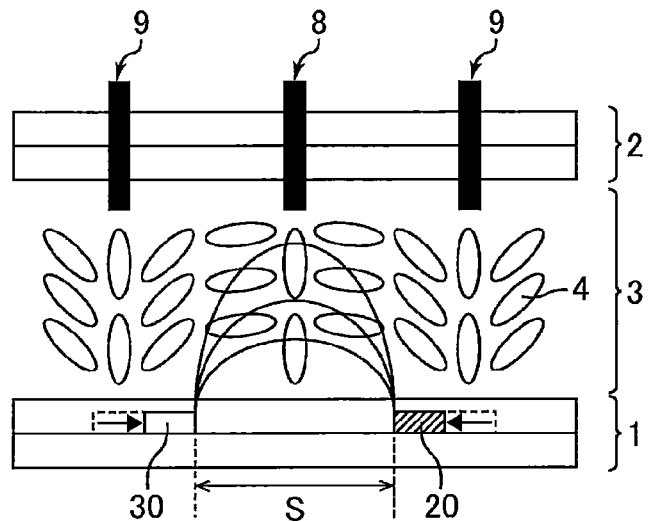
FIG. 5 is a cross-sectional view schematically depicting a liquid crystal display device of Embodiment 1 when a voltage is applied. This view corresponds to an X1-X2 line cross-sectional view in FIG. 6.

Meanwhile, if the distance S between the electrodes is narrow as shown in FIG. 5, the voltage applied to the liquid crystal layer 3 increases so that the liquid crystal molecules 4 aligning in the vertical direction can be resistant to tilting upon receiving a pressure from outside. Namely, if a pressure is applied from outside to the panel surface, the dark line 8 can be prevented from disappearing.

It is to be noted that if the distance S between the electrodes is simply decreased, the number of the comb-tooth portion 22 and the comb-tooth portion 32 in each picture element increases. Also, since the dark line 9 is generated on the comb-tooth portion 22 and the comb-tooth portion 32, the transmittance decreases.

Figure 6:
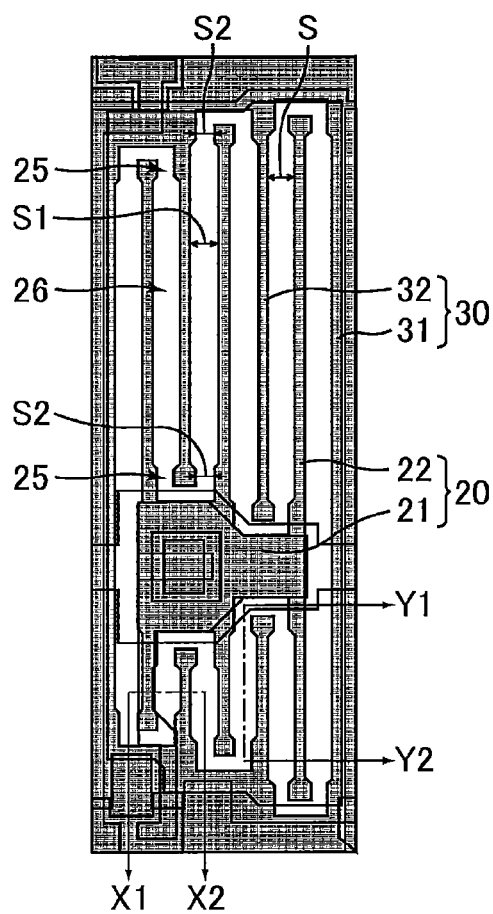
FIG. 6 is a plan view schematically depicting a liquid crystal display device of Embodiment 1.
Figure 7:
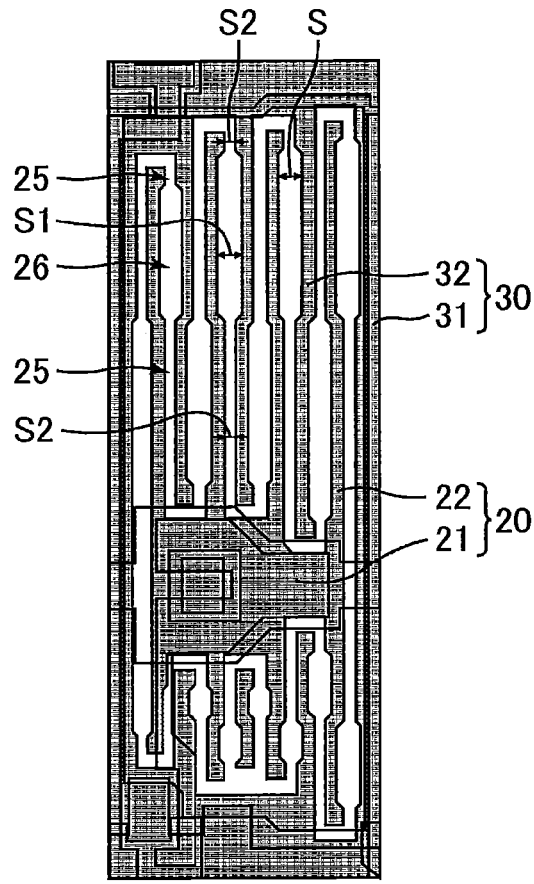
FIG. 7 is a plan view schematically depicting a liquid crystal display device of Embodiment 1.

As shown in FIG. 6 and FIG. 7, by modifying the shapes of the pixel electrode 20 and the common electrode 30 to partially narrow the distance S between the electrodes, it is possible to achieve a structure in which the liquid crystal molecules are less likely to tilt when a pressure is applied from outside (a finger press domain is less likely to occur) can be achieved.

More specifically, the distance S between the electrodes is partially narrower at least at two sites of the comb-tooth portion 22 and the comb-tooth portion 32 in the longitudinal direction thereof. Namely, the pixel electrode 20 and the common electrode 30 have a second portion, a first portion, and a third portion adjacent in said order in the longitudinal direction of the comb-tooth portion 22 and the comb-tooth portion 32. The distance S2 between the electrodes at the second portion and the third portion is narrower than the distance S1 between the electrodes at the first portion. Meanwhile, the distance between the electrodes at the second portion and the distance between the electrodes at the third portion are set to be the same in FIG. 6 and FIG. 7; however, the distances may be different from each other as well.

In the foregoing electrode shape, a blank portion 26 of the electrode having a wide distance S1 between the electrodes (hereinafter also referred to as a wide distance portion) is sandwiched by (adjacent to) two blank portions 25 of the electrodes having a narrow distance S2 between the electrodes (hereinafter, also referred to as a narrow distance portion), in the longitudinal direction of the comb-tooth portion 22 and the comb-tooth portion 32. The blank portions of the electrodes are the region without electrode, namely openings of the electrodes.

The distance S1, S2 is not particularly limited. The distance S1 is preferably 1 to 20 µm (more preferably 2 to 12 µm) in the same viewpoint as that in the case of the distance between the pixel electrode 20 and the common electrode 30.

The distance S2 is preferably 1 to 9.5 µm (more preferably 2 to 8 µm). If the distance S2 exceeds 9.5 µm, a finger press domain may be generated. If the distance S2 is less than 1 µm, the space (blank portion) between the pixel electrode 20 and the common electrode 30 may not be formed by a photolithography method.

The pixel electrode 20 and the common electrode 30 face parallel to each other at the first to the third portions. Therefore, the length of the wide distance portion 26 and that of the narrow distance portion 25 in the transverse direction of the comb-tooth portion 22 and the comb-tooth portion 32 are respectively uniform.

Figure 8:
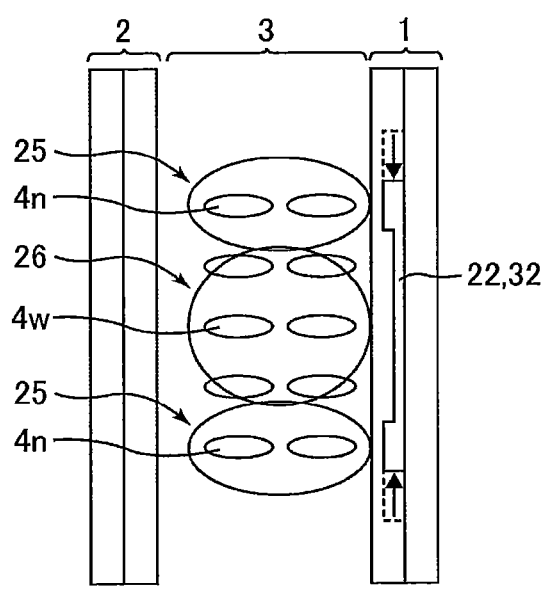
FIG. 8 is a cross-sectional view schematically depicting a liquid crystal display device of Embodiment 1 when a voltage is applied. This view corresponds to a Y1-Y2 line cross-sectional view in FIG. 6.

In order to avoid a finger press domain, the length of the comb-tooth portion 22 and the comb-tooth portion 32 (distance between the two narrow distance portions 25) may be decreased as shown in FIG. 8. In this case, the liquid crystal molecules 4n present in the narrow distance portion 25 are less likely to be tilted by a pressure from outside as mentioned earlier. Therefore, liquid crystal molecules 4w present in the wide distance portion 26 in the vicinity of the center of the space between the pixel electrode 20 and the common electrode 30 tend to align in the vertical direction due to the influence of the liquid crystal molecules 4n present in the narrow distance portion 25. Namely, the transmittance can be prevented from decreasing while generation of a finger press domain can be suppressed as well.

Meanwhile, the comb-tooth portion 22 and the comb-tooth portion 32 do not actually exist on the Y1-Y2 line in FIG. 6; however, for convenience of explanation, the comb-tooth portion 22 and the comb-tooth portion 32 are depicted in FIG. 8.

Moreover, regarding the liquid crystal materials to be used, a higher viscosity of the liquid crystal can prevent liquid crystal molecules which align vertically to the main surfaces of the substrates 1 and 2 from being tilted by a pressure from outside. Namely, it is possible to make a finger press domain less likely to occur.

As mentioned earlier, the liquid crystal display device of the present embodiment can suppress generation of a finger press domain.

With regard to the liquid crystal molecules aligning vertically on the comb-tooth portion 22 and the comb-tooth portion 32, since a transverse electric field is not applied thereto, and also they align vertically to the main surfaces of the substrates 1 and 2 by the vertical alignment films 16, 44, the liquid crystal molecules do not tilt even upon receiving a pressure from outside. Therefore, if a pressure from outside is applied, the dark line 9 normally does not disappear.

The liquid crystal display device of the present embodiment may be a reflection type liquid crystal display device or a semi-transmissive type (reflection and transmissive type) liquid crystal display device.

(Evaluation Test)

Figure 9:
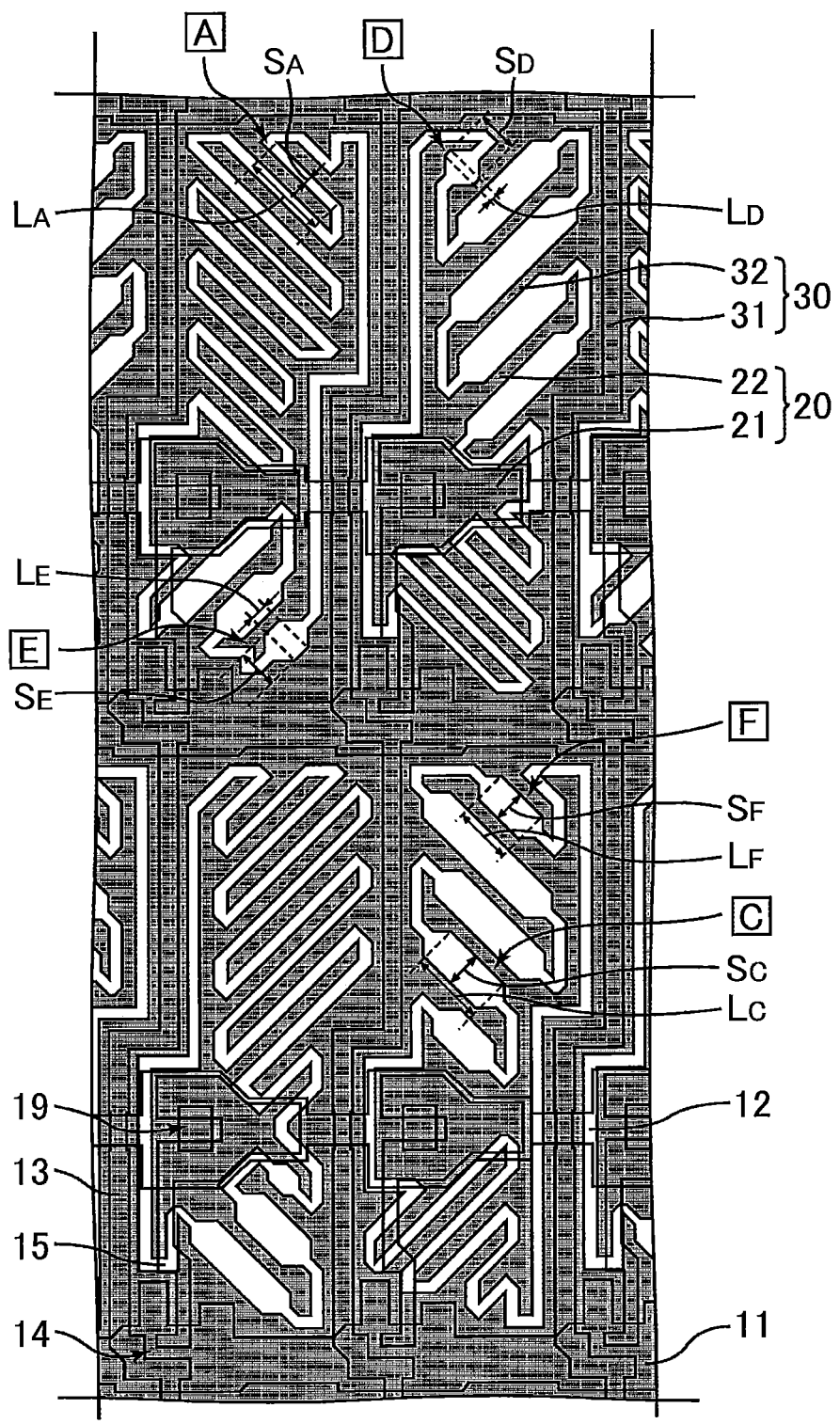
FIG. 9 is a plan view schematically depicting a liquid crystal display panel used in the evaluation test.
Figure 10:
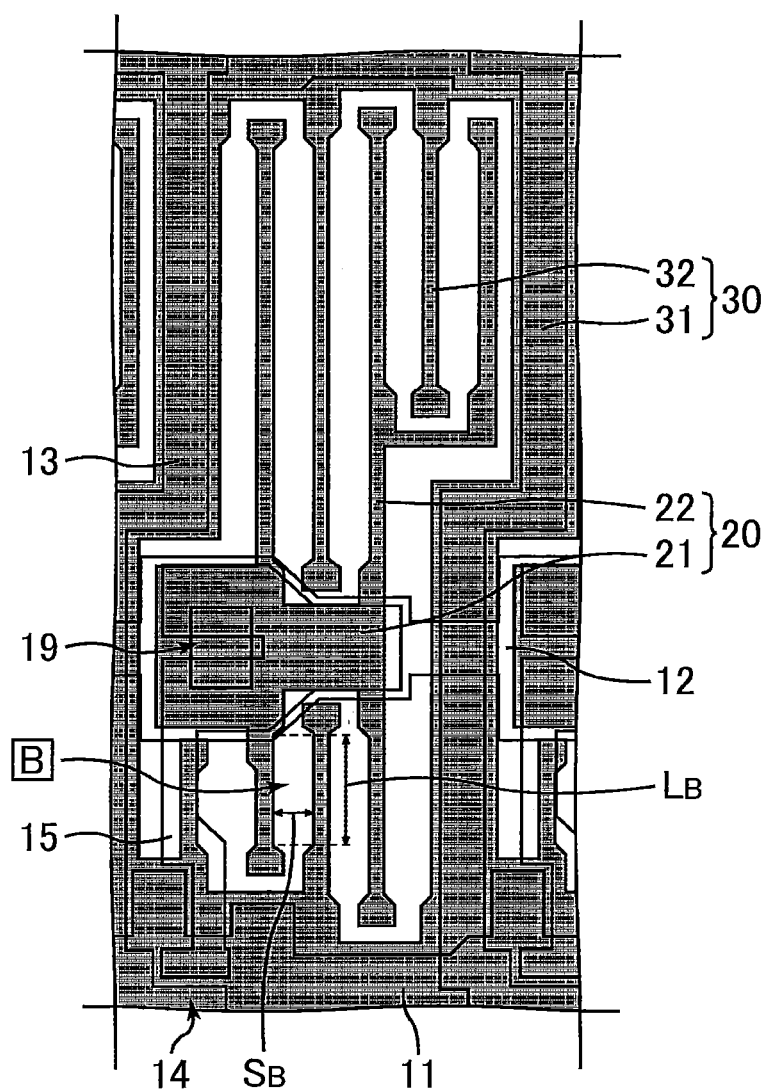
FIG. 10 is a plan view schematically depicting a liquid crystal display panel used in the evaluation test.

A liquid crystal display panel having the dot pattern shown in FIGS. 9, 10 was prepared, and generation or non-generation of a finger press domain was checked.

A gate bus line 11 and a Cs bus line 12, a semiconductor layer containing an amorphous silicon, a gate insulating film containing a silicon nitride, and a source bus-line 13 and a drain line 15 were formed in said order on a glass substrate having a thickness of 700 μm. A TFT 14 was a channel etch type TFT produced by a method including etching a little of the semiconductor layer upon separation of the source bus line 13 and the drain bus line 15, and also an inverted staggered type TFT in which a gate was disposed below (glass substrate side) the source bus line 13 and the drain line 15.

A silicon nitride inorganic insulating film having a thickness of 330 nm was formed by a CVD method. Then, a photosensitive acrylic resin film having a thickness of 2.7 μm was formed on the inorganic insulating film by a spin coat method. The resin film was exposed to light according to a desired pattern, and was developed with an alkaline solution. Thereby only the parts exposed to light were etched in the alkaline solution. The inorganic insulating layer under the etched acrylic resin film (more specifically, the exposed pars of the inorganic insulating film) was further etched so that a contact hole 19 penetrating the inorganic insulating film and the resin film was formed.

Next, a 10 nm-thick transparent conductive film including IZO was formed by a sputtering method. The transparent conductive film was subjected to patterning as shown in FIGS. 9, 10 so that a pixel electrode 20 and a common electrode 30 were produced. In the liquid crystal display pane shown in FIG. 9, a comb-tooth portion 22 of the pixel electrode 20 and a comb-tooth portion 32 of the common electrode 30 were each formed along 45° or 134° direction.

A 1.0 μm-thick BM layer 41 containing a carbon-containing acrylic resin, color layers of R, G, B including a pigment-containing acrylic resin (thickness of R film: 1.7 μm, thickness of G film: 1.7 μm, thickness of R film: 1.7 μm), and a 1.5 μm-thick overcoat layer containing a resin were formed in said order on another glass substrate having a thickness of 700 μm. Next, a 3.5 μm-high photospacer containing a photosensitive resin was formed on the region overlapping the BM layer 41.

An alignment film material including polyindo was applied on the above substrates by a printing method, followed by baking process, so that vertical alignment films 16, 44 having a thickness of 800 μm were formed. The alignment film material used was AL61960 (product of JSR corporation).

Next, these substrates were laminated with one another with the photospacer interposed therebetween so that an empty cell not being filled in with liquid crystals was produced. Meanwhile, the cell gap d was set to 3.5 μm.

Thereafter, a nematic liquid crystal material having positive dielectric anisotropy is poured into the cell. Three kinds of liquid crystal materials respectively having a rotational viscosity of 155 mPa·s, 197 mPa·s, and 372 mPa·s were used herein. In each of the three kinds of liquid crystal materials, $\Delta n=0$, and $\Delta \epsilon =22$.

Lastly, a linear polarizer was attached to the outer main surface of each of the substrates so that liquid crystal display panels were produced. Meanwhile, in the liquid crystal display panel shown in FIG. 9, the polarizers were attached in such a manner that the absorption axis of one of the polarizers faces in a vertical direction, and the absorption axis of the other polarizer faces in a lateral direction.

The surface of the liquid crystal display panel was pressed with a finger when the light was on. Then, generation or non-generation of a finger press domain (disappearance of the dark line 8) in the electrode patterns A to F shown in FIGS. 9, 10 was determined by light microscopy observation. Tables 1, 2 show the results.

AC voltage (amplitude: 60 V, frequency: 30 Hz) was applied to the pixel electrode 20. DC voltage having a relative potential of 0V to Vc (amplitude center) of pixel electrode 30 was applied to the common electrode 30.

The following explains each pattern. In patterns A to D, F, the comb-tooth portion 22 and the comb-tooth portion 32 are disposed to face parallel to each other. In pattern E, the comb-tooth portion 22 and the trunk portion 31 are disposed to face parallel to each other.

In pattern A, the distance between the comb-tooth portion 22 and the comb-tooth portion 32 is set constant. Namely, the blank portion of the electrodes adjacent to the comb-tooth portion 22 and the comb-tooth portion 32 in their transverse direction is an equally-distanced portion.

The equally-distanced portion refers to a blank portion of the electrodes, in which the length in the transverse direction of at least one of the comb-tooth portion 22 and the comb-tooth portion 32 is set constant.

The distance $S_A$ between the electrodes of the equally-distanced portion in pattern A is 4 μm. The distance $L_A$ of the equally-distanced portion in the longitudinal direction of the comb-tooth portion 22 and the comb-tooth portion 32 in pattern A is 25 μm.

In patterns B to D, F, the distance between the comb-tooth portion 22 and the comb-tooth portion 32 is partially narrow. Namely, the blank portion of the electrodes adjacent in the transverse direction to the comb-tooth portion 22 and the comb-tooth portion 32 includes a wide distance portion, and two narrow distance portions which sandwich the wide distance portion.

Also, in pattern E, the distance between the comb-tooth portion 22 and the trunk portion 31 is partially narrow. Namely, the blank portion of the electrodes adjacent in the transverse direction to the comb-tooth portion 22 includes a wide distance portion, and two narrow distance portions which sandwich the wide distance portion.

Moreover, in patterns B to F, the length of each of the wide distance portion and the narrow distance portion in the transverse direction of the comb-tooth portion 22 (and the comb-tooth portion 32) is constant. Namely, the wide distance portion and the narrow distance portion in patterns B to F are an equally-distanced portion as well.

The distance $S_B$ between the electrodes of the wide distance portion in pattern B is 8 μm, and the distance $L_B$ of the equally-distanced portion in the longitudinal direction of the comb-tooth portion 22 and the comb-tooth portion 32 in pattern B is 25 μm.

The distance $S_C$ between the electrodes of the wide distance portion in pattern C is 12 μm, and the distance $L_C$ of the wide distance portion in the longitudinal direction of the comb-tooth portion 22 and the comb-tooth portion 32 in pattern C is 25 μm.

The distance $S_D$ between the electrodes of the wide distance portion in pattern D is 12 μm, and the distance $L_D$ of the wide distance portion in the longitudinal direction of the comb-tooth portion 22 and the comb-tooth portion 32 in pattern D is 5 μm.

The distance $S_E$ between the electrodes of the wide distance portion in pattern E is 12 μm, and the distance $L_E$ of the wide distance portion in the longitudinal direction of the comb-tooth portion 22 in pattern E is 7 μm.

The distance $S_F$ between the electrodes of the wide distance portion in pattern F is 12 μm, and the distance $L_F$ of the wide distance portion in the longitudinal direction of the comb-tooth portion 22 and the comb-tooth portion 32 in pattern F is 15 μm.

The distance between the electrodes of the narrow distance portion in patters B to F is all 4 μm.

TABLE 1

| Distance S between electrodes [μm] | Length L of equally-distanced portion [μm] | Generation of finger press domain Rotational viscosity of liquid crystal material [mPa · s] | | | Electrode pattern |
|---|---|---|---|---|---|
| | | 372 | 197 | 155 | |
| 4 | 25 | not generated | not generated | not generated | A |
| 8 | 25 | not generated | generated | generated | B |
| 12 | 25 | generated | generated | generated | C |

TABLE 2

| Distance S between the electrodes [μm] | Length L of equally-distanced portion [μm] | Generation of finger press domain Rotational viscosity of liquid crystal material [mPa · s] | | Electrode pattern |
|---|---|---|---|---|
| | | 372 | 155 | |
| 12 | 5 | not generated | not generated | D |
| 12 | 7 | not generated | generated | E |
| 12 | 15 | generated | generated | F |

The results show that, according to Table 1, a finger press domain can be prevented from generating if the distance S between the electrodes of the equally-distanced portion is at most 10 μm (for example 8 μm), and the rotational viscosity of the liquid crystal material is at least 130 mPa·s (for example 155 mPa·s).

It is found that, especially if the distance S between the electrodes of the equally-distanced portion is at most 6 μm (for example 4 μm), a finger press domain can be surely prevented from generating.

It is also found that, if the rotational viscosity of the liquid crystal material is at least 300 mPa·s (for example 372 mPa·s), a finger press domain can be surely prevented from generating.

Moreover, in the above case, since the wide distance portion is sandwiched by the two narrow distance portions in pattern B, an effect for preventing generation of a finger press domain is high.

It is found that, according to Table 2, a finger press domain can be prevented from generating if the length of the equally-distanced portion (wide distance portion) in the longitudinal direction of the comb-tooth portion 22 (and the comb-tooth portion 32) is at most 10 μm (for example 7 μm), and the rotational viscosity of the liquid crystal material is at least 130 mPa·s (for example 155 mPa·s).

It is found that, especially if the length of the equally-distanced portion (wide distance portion) in the longitudinal direction of the comb-tooth portion 22 (and the comb-tooth portion 32) is at most 6 μm (for example 5 μm), a finger press domain can be surely prevented from generating.

It is also found that, if the rotational viscosity of the liquid crystal material is at least 300 mPa·s (for example 372 mPa·s), a finger press domain can be surely prevented from generating.

Moreover, in the above case, since the wide distance portion is sandwiched by the narrow distance portions in patterns D, E, an effect for preventing generation of a finger press domain is high.

The present application claims priority to Patent Application No. 2009-129515 filed in Japan on May 28, 2009 under the Paris Convention and provisions of national law in a designated State. The entire contents of which are hereby incorporated by reference.

EXPLANATION OF SYMBOLS 100 liquid crystal display panel
1 active matrix substrate (array substrate)
2 counter substrate
3 liquid crystal layer
4, 4n, 4w liquid crystal molecule
5 transverse electric field
8, 9 dark line
10 insulating substrate
11 gate bus line 12 Cs bus line
13 source bus line
14 TFT
15 drain lines
16 vertical alignment film
17 semiconductor layer
19 contact hall
20 pixel electrode
21 trunk portion
22 comb-tooth portion
25 narrow distance portion
26 wide distance portion
30 common electrode
32 trunk portion
40 comb-tooth portion
40 insulating substrate
41 BM layer
44 vertical alignment film

The invention claimed is:

1. A liquid crystal display device, comprising:
a pair of substrates disposed to face each other, and
a liquid crystal layer sandwiched between the pair of substrates,
wherein one of the pair of substrates includes a pair of electrodes in pixel, each of the electrodes including a comb-tooth portion,
a first comb-tooth portion of one of the pair of electrodes and a second comb-tooth portion of the other one of the pair of electrodes are disposed to face each other,
the liquid crystal layer includes p-type nematic liquid crystals and is driven by an electric field generated between the pair of electrodes,
the p-type nematic liquid crystals are aligned perpendicularly to surfaces of the pair of substrates when no voltage is applied,
the distance between the pair of electrodes in a transverse direction of the comb-tooth portions of the pair of electrodes is at most 6 μm, a rotational viscosity of the p-type nematic liquid crystals is at least 130 mPa·s;
wherein a blank portion of the pair of electrodes is provided adjacent to at least one of the first comb-tooth portion and the second comb-tooth portion of the pair of electrodes,
the blank portion is positioned in the transverse direction of the comb-tooth portion that the blank portion is adjacent to,
the blank portion includes an equally-distanced portion having a constant length in the transverse direction of the comb-tooth portion that the blank portion is adjacent to;
wherein the distance between the pair of electrodes changes along a longitudinal direction of the comb-tooth portions of the pair of electrodes,
the pair of electrodes include a first part in which the pair of electrodes face each other with a first distance between them; a second part in which the pair of electrodes face each other with a second distance smaller than the first distance between them; and a third part in which the pair of electrodes face each other with a third distance smaller than the first distance between them,
the second part, the first part, and the third part are adjacent one another in said order in the longitudinal direction of the comb-tooth portions of the pair of electrode, and
the equally-distanced portion is adjacent to the first part.

2. The liquid crystal display device according to claim 1, wherein the distance between the pair of electrodes in a transverse direction of the comb-tooth portions of the pair of electrodes is at most 6 μm.

3. The liquid crystal display device according to claim 1, wherein the rotational viscosity is at least 300 mPa·s.

4. The liquid crystal display device according to claim 1, wherein the pair of electrodes face parallel to each other in the second part, the first part, and the third part.

5. The liquid crystal display device according to claim 1, wherein the second distance is equal to the third distance.

6. A liquid crystal display device, comprising:
a pair of substrates disposed to face each other, and
a liquid crystal layer sandwiched between the pair of substrates,
wherein one of the pair of substrates includes a pair of electrodes in pixel, each of the electrodes including a comb-tooth portion,
a first comb-tooth portion of one of the pair of electrodes and a second comb-tooth portion of the other one of the pair of electrodes are disposed to face each other,
the liquid crystal layer includes p-type nematic liquid crystals and is driven by an electric field generated between the pair of electrodes,
the p-type nematic liquid crystals are aligned perpendicularly to surfaces of the pair of substrates when no voltage is applied,
a blank portion of the pair of electrodes is provided adjacent to at least one of the first comb-tooth portion and the second comb-tooth portion of the pair of electrodes,
the blank portion is positioned in the transverse direction of the comb-tooth portion that the blank portion is adjacent to,
the blank portion includes an equally-distanced portion having a constant length in the transverse direction of the comb-tooth portion that the blank portion is adjacent to,
the equally-distanced portion has a length of at most 6 μm in the longitudinal direction of the comb-tooth portion that the blank portion is adjacent to,
a rotational viscosity of the p-type nematic liquid crystals is at least 130 mPa·s;
wherein the distance between the air of electrodes changes along a longitudinal direction of the comb-tooth portions of the pair of electrodes,
the pair of electrodes include a first part in which the pair of electrodes face each other with a first distance between them; a second part in which the pair of electrodes face each other with a second distance smaller than the first distance between them; and a third part in which the pair of electrodes face each other with a third distance smaller than the first distance between them,
the second part, the first part, and the third part are adjacent one another in said order in the longitudinal direction of the comb-tooth portions of the pair of electrode, and
the equally-distanced portion is adjacent to the first part.

7. The liquid crystal display device according to claim 6, wherein the equally-distanced portion has a length of at most 6 um in the longitudinal direction of thecomb-tooth portion that the blank portion is adjacent to.

8. The liquid crystal display device according to claim 6, wherein the rotational viscosity is at least 300 mPa·s.

9. The liquid crystal display device according to claim 6, wherein the distance between the pair of electrodes in a transverse direction of the comb-tooth portions of the pair of electrodes is at least 8 μm.

10. The liquid crystal display device according to claim 6, wherein the distance between the pair of electrodes in a transverse direction of the comb-tooth portions of the pair of electrodes is at most 16 μm.

11. The liquid crystal display device according to claim 6, wherein the pair of electrodes face parallel to each other in the second part, the first part, and the third part.

12. The liquid crystal display device according to claim 6, wherein the second distance is equal to the third distance.

13. A liquid crystal display device, comprising:
a pair of substrates disposed to face each other, and
a liquid crystal layer sandwiched between the pair of substrates,
wherein one of the pair of substrates includes a pair of electrodes in pixel, each of the electrodes including a comb-tooth portion,
a first comb-tooth portion of one of the pair of electrodes and a second comb-tooth portion of the other one of the pair of electrodes are disposed to face each other,
the liquid crystal layer includes p-type nematic liquid crystals and is driven by an electric field generated between the pair of electrodes,
the distance between the pair of electrodes changes along a longitudinal direction of the comb-tooth portions of the pair of electrodes,
the pair of electrodes include a first part in which the pair of electrodes face each other with a first distance between them; a second part in which the pair of electrodes face each other with a second distance smaller than the first distance between them; and a third part in which the pair of electrodes face each other with a third distance smaller than the first distance between them, and
the second part, the first part, and the third part are adjacent one another in said order in the longitudinal direction of the comb-tooth portions of the pair of electrode.

14. The liquid crystal display device according to claim 13, wherein the pair of electrodes face parallel to each other in the second part, the first part, and the third part.

15. The liquid crystal display device according to claim 13, wherein the second distance is equal to the third distance.

16. The liquid crystal display device according to claim 13, wherein the p-type nematic liquid crystals are aligned perpendicularly to surfaces of the pair of substrates when no voltage is applied.

17. The liquid crystal display device according to claim 13, wherein each of the pair of electrodes projects toward the other electrode in the second and third parts.

* * * * *